(12) United States Patent
Hillsdon

(10) Patent No.: US 6,568,631 B1
(45) Date of Patent: May 27, 2003

(54) LAUNCHING OF HIGH ALTITUDE AIRSHIPS

(75) Inventor: Reginald H. Hillsdon, Northamptonshire (GB)

(73) Assignee: Advanced Technologies Group Limited, Bedfordshire (GB)

( * ) Notice: Subject to any disclaimer, the term of this patent is extended or adjusted under 35 U.S.C. 154(b) by 0 days.

(21) Appl. No.: 09/913,129

(22) PCT Filed: Feb. 8, 2000

(86) PCT No.: PCT/GB00/00386

§ 371 (c)(1),
(2), (4) Date: Nov. 20, 2001

(87) PCT Pub. No.: WO00/47467

PCT Pub. Date: Aug. 17, 2000

(30) Foreign Application Priority Data

Feb. 9, 1999 (GB) ............................................. 9902876

(51) Int. Cl.⁷ .............................. B64B 1/02; B64B 1/66; E04H 6/44
(52) U.S. Cl. ........................... 244/30; 244/63; 244/115; 244/98
(58) Field of Search ............................. 244/30, 31, 63, 244/98, 115, 125, 127; 52/66, 72

(56) References Cited

U.S. PATENT DOCUMENTS

| | | | | |
|---|---|---|---|---|
| 1,542,484 A | * | 6/1925 | Stevens | ...................... 244/115 |
| 1,829,503 A | * | 10/1931 | Carlotti | ...................... 244/115 |
| 3,746,282 A | * | 7/1973 | Vorachek | ...................... 244/31 |
| 4,265,418 A | * | 5/1981 | Eymard | ...................... 244/31 X |
| 5,257,481 A | * | 11/1993 | Reppas et al. | .............. 52/66 X |

* cited by examiner

Primary Examiner—Robert P. Swiatek
(74) Attorney, Agent, or Firm—Dann, Dorfman, Herrell and Skillman; Henry H. Skillman

(57) ABSTRACT

A method of launching inflatable airship apparatus (3) for subsequent ascent to high altitude for operation as an airship having a hull (4) formed from an inflated flexible gas containment envelope (5), payload (15), drive motor (6) mounted at the stern of the hull and cables (26,27), for supporting the payload (15) within the hull (4), connected to the drive motor (6) and to the hull at, or adjacent to, a nose portion of the hull. The method comprises partially inflating the gas containment envelope (5) with a lighter than air gaseous medium to cause the nose portion to rise within a vertical launch enclosure (10) to position the partially inflated gas containment envelope (5) in a launch position, and subsequently releasing the partially inflated gas containment envelope (5) from its launch position through an open top of the vertical enclosure so that the envelope ascends clear of the vertical enclosure (10) and lifts the payload means (15) and drive motor (6) by means of the cables. The invention also relates to inflatable airship apparatus (3) and to a launch station (2) for launching inflatable airship apparatus.

11 Claims, 6 Drawing Sheets

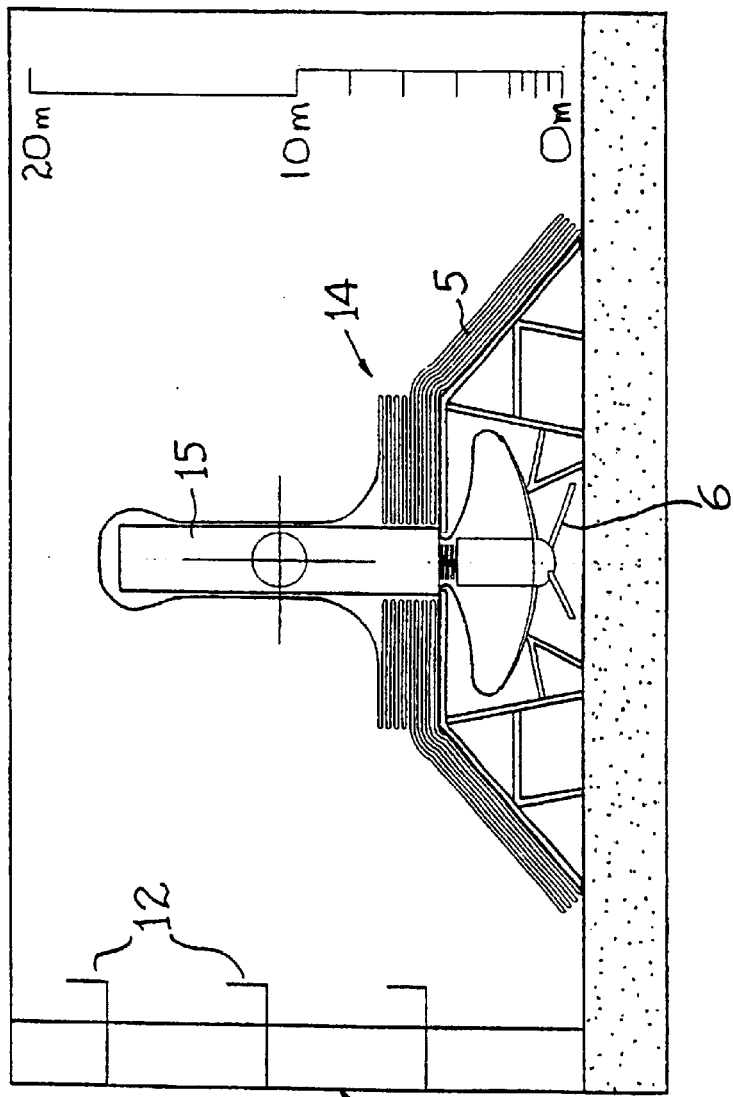
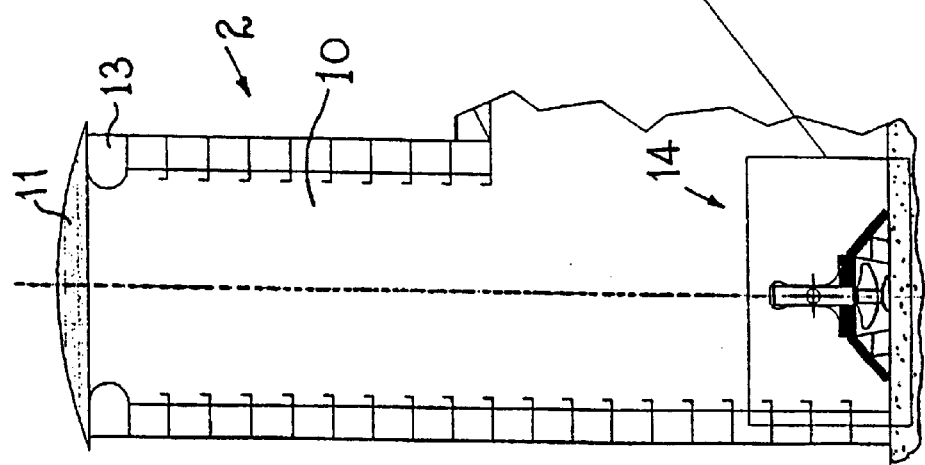

FIG. 4.
FIG. 5
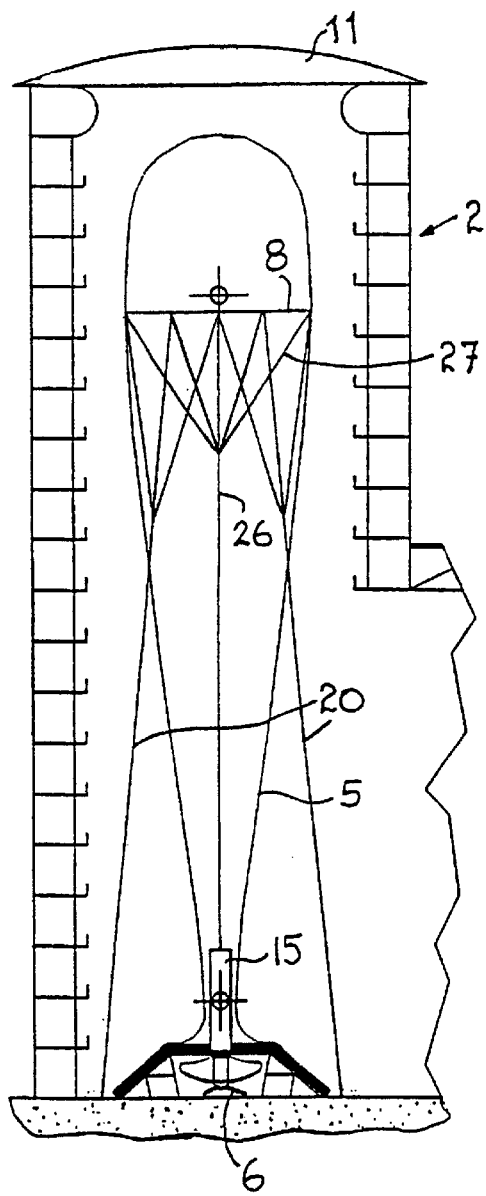
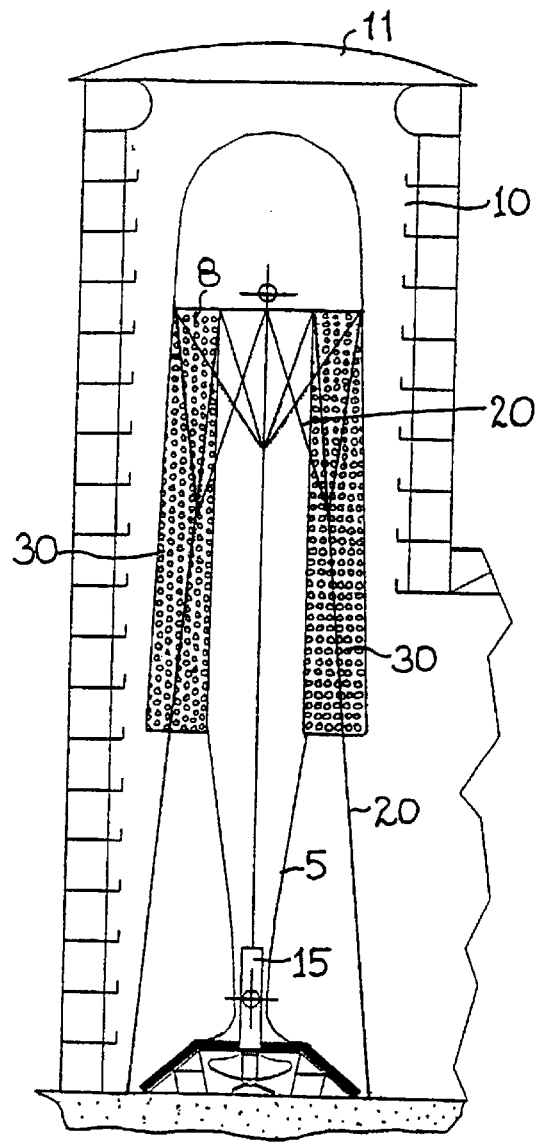

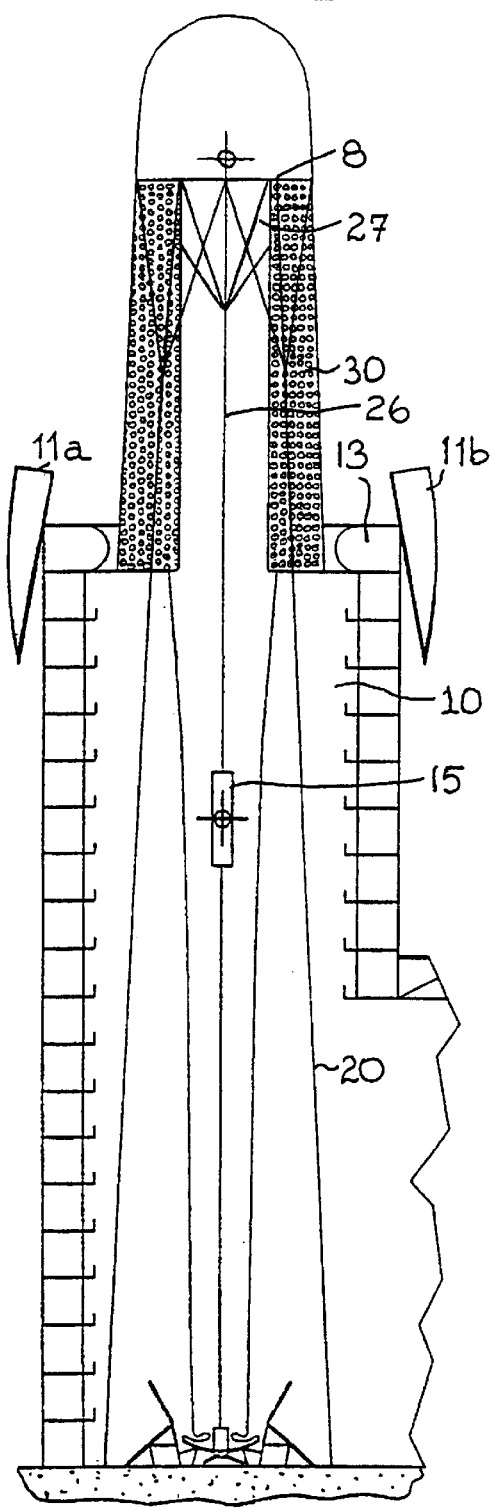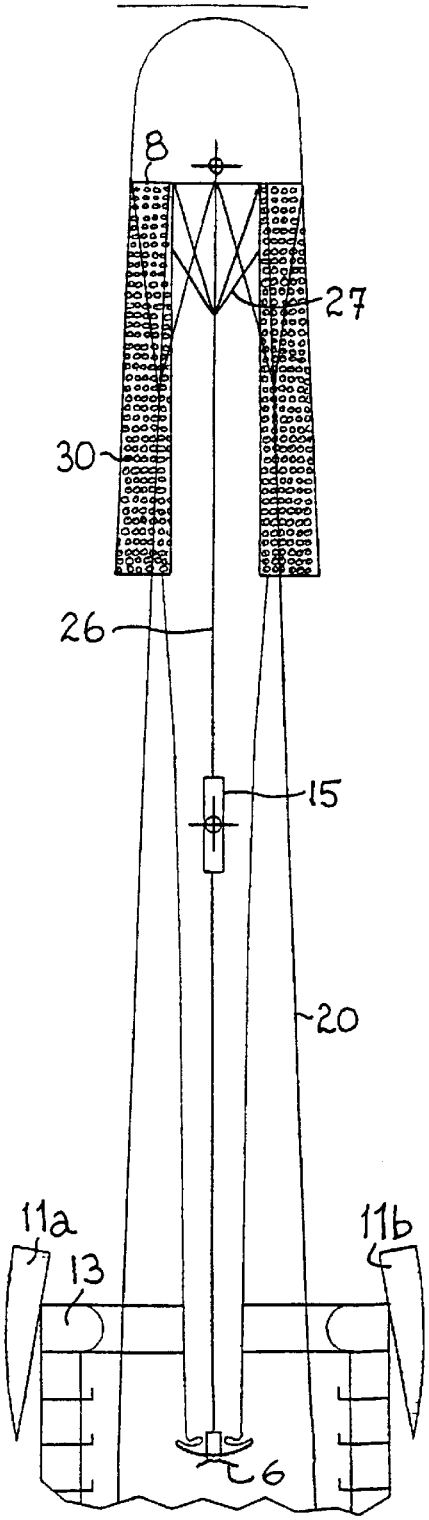

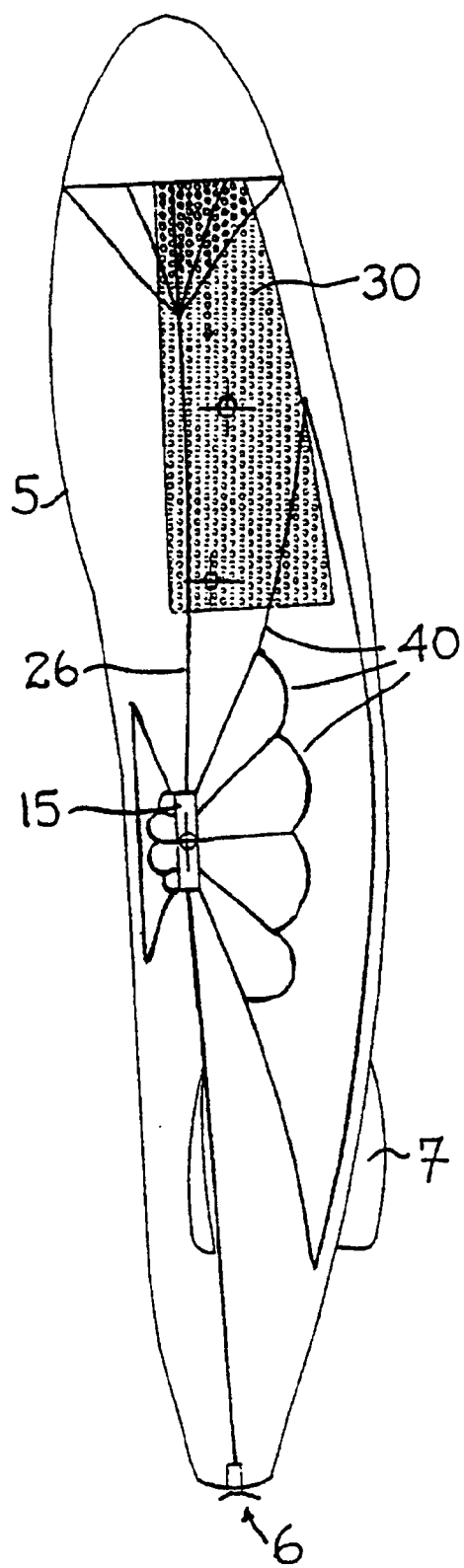

US 6,568,631 B1

LAUNCHING OF HIGH ALTITUDE AIRSHIPS

TECHNICAL FIELD

This invention relates to a method of launching inflatable airship apparatus for subsequent ascent to high altitude for operation as an airship. The invention is particularly, but not exclusively, involved with the launching of unmanned airship apparatus. The invention also relates to airship apparatus and to an airship launch station.

BACKGROUND OF THE INVENTION

High altitude airships are designed to carry large payloads to high altitude and then to remain in a geo-stationary orbit for extended lengths of time. While there are many challenges facing the design of such an airship one of the primary ones is that of effecting a controlled launch of the vehicle.

The operation close to the ground of a high altitude airship, which is an extremely lightly constructed vehicle, requires levels of thrust and control that cannot be provided by the vehicle itself in anything more than absolutely calm conditions. Due to the difficulty in predicting these calm conditions it is almost impossible to provide a guaranteed launch capability for operational efficiency. Further to this, challenges exist in the provision of a safe means of recovery following the completion of a mission. In particular it is difficult to maintain operation of the envelope pressure system which maintains the pressure within, and hence the shape of, the airship's envelope. The envelope pressure system is only required to function during launch and recovery of the vehicle and thus is subject to cold soak for potentially several years prior to descent and recovery. If conventional internal ballonet "sacs" are employed, this cold soak may render the internal ballonet "sacs" inoperative by the freezing action of water vapour within the envelope effectively bonding the sacs to the envelope. This would result in the loss of the vehicle during the descent phase of the mission due to lack of envelope internal pressure and ensuing structural failure.

Significant experience has been gained in the launching (and recovery) of meteorological balloons over many years. These balloons are vertically launched in a low state of helium fill and as they ascend to altitude the helium expands and they take on their full "hot air balloon" shape. However such balloons are un-powered and effectively drift with the prevailing wind. The balloons remain in the vertical position throughout their flight.

DISCLOSURE OF THE INVENTION

An aim of the present invention is to provide an improved method of launching high altitude airship apparatus.

According to one aspect of the present invention there is provided a method of launching inflatable airship apparatus for subsequent ascent to high altitude for operation as an airship having a hull formed from an inflated flexible gas containment envelope, payload means, drive means mounted at the stern of the hull and cable suspension means, for supporting the payload means within the hull, connected to said drive means and to the hull at, or adjacent to, a nose portion of the hull, the method comprising partially inflating said gas containment envelope with a lighter than air gaseous medium to cause said nose portion to fill with said gaseous medium and to rise within a vertical launch enclosure to position the partially inflated gas containment envelope in a launch position, and subsequently releasing the partially inflated gas containment envelope from its launch position through an open top of the vertical enclosure so that the envelope ascends clear of the vertical enclosure and lifts the payload means and drive means by means of the cable suspension means.

The method according to the invention allows for the controlled release of the airship apparatus from a vertical enclosure. The airship apparatus can be held in its launch position ready for launch until the prevailing weather conditions are satisfactory for launching. As the airship apparatus ascends, the gaseous medium, e.g. helium, within the gas containment envelope starts to expand and the envelope takes on a fuller form. As the shape of the airship starts to form, the centre of gravity of the vehicle starts to rotate around the centre of lift ultimately resulting in the airships hull rotating to a level flight capable attitude. The drive means can then begin to function and the vehicle can be propelled and flown in the manner of a standard airship.

Vertical launching of the airship apparatus is performed with a far higher certainty of success than conventional launching procedures. The design centres around a launch station, typically in the form of a cylindrical building with a removable roof. Such a launch station allows the airship to be filled with the gaseous medium, e.g. helium, and prepared for flight in a weather proof environment. With local weather forecasting, a small local weather window can be predicted with certainty. At the appointed moment the roof is retracted and the airship apparatus ascends vertically out of the top of the building. The ascent then follows a typical meteorological balloon pattern until "roll over" is achieved whereupon and the now-formed airship is flown to its site of operation.

Preferably the top of the vertical launch enclosure is provided with an openable closure which is normally closed to protect the enclosure from the elements but which is opened when the partially inflated gas containment envelope is ready for release from its launch position.

Preferably the rise of the gas containment envelope to its launch position and subsequently through the open top of the vertical launch enclosure is restrained by cable retaining means. The cable retaining means suitably comprises a number of restraining cables connected to the gas containment envelope and winch means for paying out the restraining cables to control the rise of the gas containment envelope. The connection of the restraining cables to the gas containment envelope is suitably released after the lifted drive means has risen above the top of the vertical launch enclosure.

Suitably only a minor proportion, e.g. from 5–10%, preferably from 6–8% of the fully inflated volume of the gas containment envelope is initially filled with said gaseous medium, e.g. helium, at standard temperature and pressure (STP).

Conveniently, solar cell means for powering the airship in operation are secured to the gas containment envelope when the latter is in its launch position.

According to another aspect of the present invention there is provided inflatable airship apparatus intended for ascending to high altitude for operation as an airship having an elongate hull, the airship apparatus comprising a gas containment envelope inflatable to form said elongate hull, payload means inside said gas containment envelope, drive means joined to the envelope at a region of the latter destined to form the stern of the inflated hull and cable means connecting the payload means and the drive means to a connecting portion of the gas containment envelope destined to be at the bow end of the inflated hull, the cable means being arranged to support the weight of the cable means and drive means from the said connecting portion when the gas containment envelope is partially inflated and arranged with its bow end uppermost.

According to a still further aspect of the present invention their is provided a launch station for launching inflatable airship apparatus to high altitude, the launch station including a vertical enclosure, a launch pad at the bottom of the vertical enclosure for enabling airship apparatus at the bottom of the vertical enclosure to be partially inflated with lighter than air gaseous medium so that a nose portion of the airship apparatus is able to rise within the vertical enclosure to a launch position, openable and closable closure means at the top of the vertical enclosure, and restraining means for connection to airship apparatus to be launched for controlling ascent of the airship apparatus from the launch pad to the launch position and subsequently from the launch position through the top of the enclosure with the closure means in its open position.

Suitably a collar is inflated about an opening at the top of the vertical enclosure.

BRIEF DESCRIPTION OF THE DRAWINGS

An embodiment of the invention will now be described, by way of example only, with particular reference the accompanying drawings, in which:

FIG. 2 is a sectional view of a vertical enclosure of the launch station shown in FIG. 1;

FIG. 3 is an enlarged view of a launch pad of the launch station;

FIGS. 4 to 7 are views illustrating how airship apparatus is launched vertically from the launch enclosure; and FIGS. 8 to 10 are views illustrating how the airship changes from a vertical disposition to a generally horizontal disposition as the airship ascends and its hull expands.

MODES FOR CARRYING OUT THE INVENTION

Figure 1:
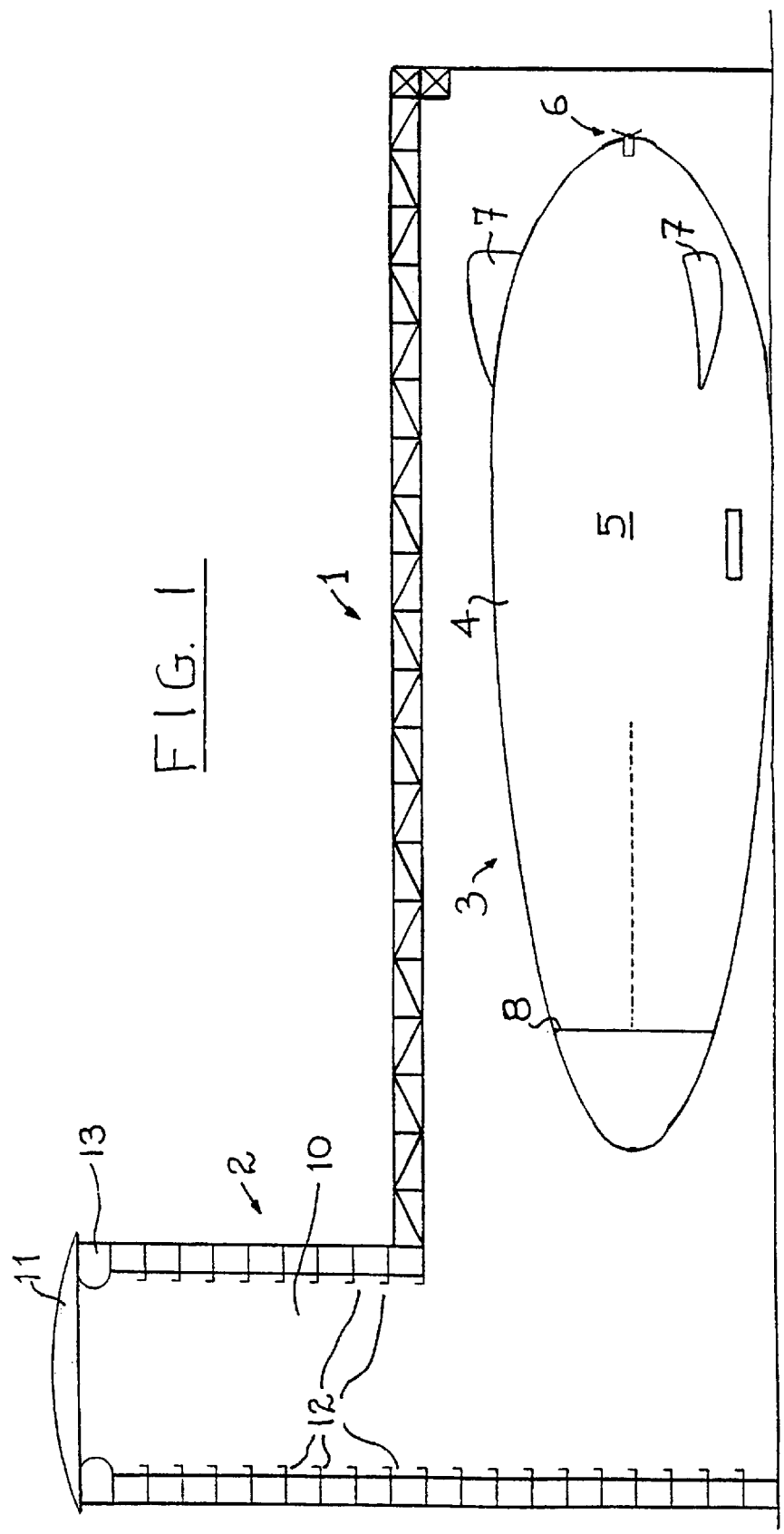
FIG. 1 is a side elevation of an airship launching station according to the invention.
Figure 9:
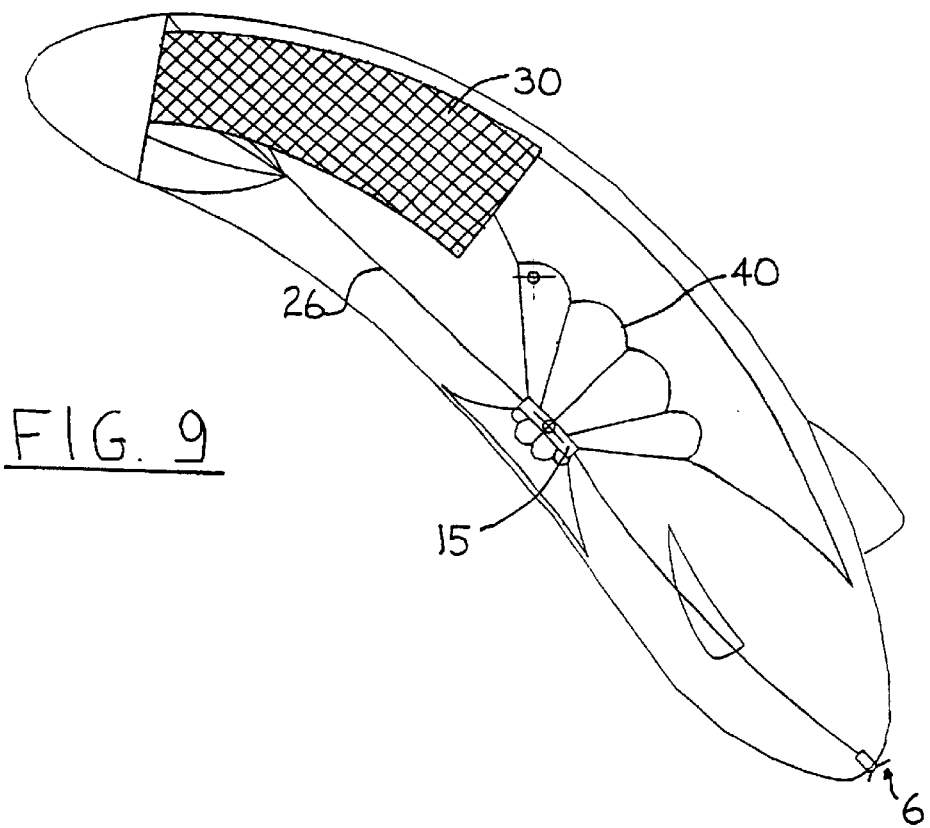
Figure 10:
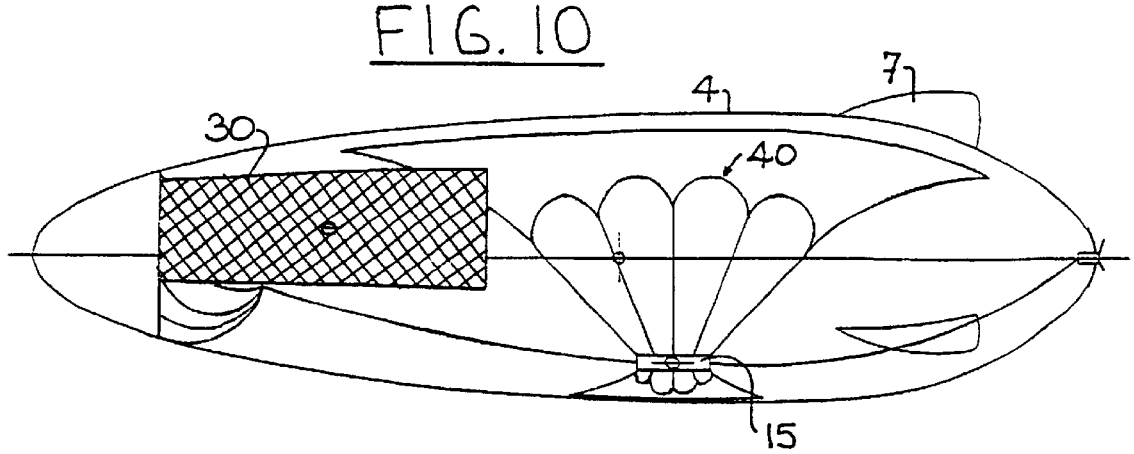

In the drawings, FIG. 1 is a general view of an airship hanger 1 with an airship launch station 2 at one end, and FIGS. 2 to 10 illustrate how airship apparatus is launched from the station to high altitude. In operation the airship is unmanned and is specifically intended for communication and/or surveillance roles. Hence a very high altitude is required to give maximum coverage, while remaining in the bounds of practicability. Since the total volume of lifting gas is dictated by the altitude, practical aspects limit the size of the airship. The airship needs to be "above the weather", i.e. above the effects of convective turbulence. Study of the world-wide atmosphere yields an altitude in a band of from 20 to 22 kilometre (65,000–72,000 ft approximately). Because of the geo-stationary requirement, the power to drive the airship depends on the natural wind speed. Since the airship must remain airborne for a period measured in years, the altitude with the lowest wind spectrum is preferred. This occurs, for the most highly populated latitudes, at around 21 kilometres with some variation due to geographical features.

In FIG. 1, the hanger 1 and launch station 2 are connected to each other. The hanger shows an airship 3 which has been pre-inflated for testing purposes. For practical purposes only a small amount of helium, or other lighter than air gaseous medium, is introduced into airship as will be discussed hereinafter. For launching, the airship is completely deflated and moved to the launch station 2. The airship 3 shown in FIG. 1 is typically 175 m long and 48 m in diameter with an internal volume of approximately 200,000 m$^3$. The airship has a hull 4 formed from a flexible gas containment envelope 5, a motor unit 6 at the rear of the hull 4, tail fins 7 and a vertical lift support ring 8 at the front end of the hull.

The launch station 2 comprises a vertical tower 10 typically about 120 m high with a motorised retractable roof closure 11. Staging balconies 12 are positioned at approximately 6 m intervals up its height to enable access to the airship during inflation described hereinafter. The balconies 12 are designed to be serviced by freight elevators and hoists (not shown). An inflatable bumper 13 is arranged at the position of the top balcony.

FIGS. 2 and 3 illustrate the airship shown in FIG. 1 in a deflated, initial launching position at a launch pad 14 at the bottom of the launch station 2. The launch pad provides a physical support for the motor unit 6 and a payload 15 carried on a gondola with the gas containment envelope 5 draped over them as shown. Careful layout of the envelope 5 is required to ensure that the fabric is not overstressed or damaged during launch.

The interior of the envelope is evacuated and a series of cables 20 (see FIGS. 4 and 5) attached to the support ring 8 and are led to a series, e.g. four, of winches (not shown) set into the floor of the launch station.

Helium (or other lighter than air gas) is now introduced into the envelope 5. For an operating altitude of 65,000 ft, an initial charge of 15,000 m$^3$ of He at S.T.P. is introduced and takes up typically 6–7% of the fully inflated hull volume. As the gas is introduced, the nose of the envelope rises towards the top of the station. The rise is controlled by the tension in the cables 20 paid out from the winches and by the weight of the fabric lifted off the launch pad. The partially inflated envelope 5 is held in a launch position (FIGS. 4 and 5), approximately 6 m from the top of the launch enclosure, with the main payload 15 still in contact with the launch pad.

In the launch position solar panels 30 are attached to the support ring 8 about 20 m aft of the nose. The panels are closely attached at the upper end around the circumference of the hull, but are left free to hang from the support ring 8. The extra weight of the solar panels removes tension from the winches, but sufficient buoyancy within the envelope ensures that the cables 20 do not go slack.

The payload 15 and motor unit 6 are suspended by a central cable 26 supported from the support ring 8 by catenary cables 27. These cables have their slack taken from them in the launch position.

To launch the partially inflated airship from its launch position, the roof closure 11 is opened within a suitable "weather window" by retracting roof parts 11a and 11b (see FIG. 6). The collar or bumper 13 is fully inflated. The winches begin to pay out cables 20 and the weight of the payload 15 and motor unit 6 are taken by the central cable 26 and cables 27. The payload 15 (typically in a gondola) lifts off the launch pad and the remainder of the envelope is lifted to the top of the tower 10. Eventually the vertical cable from the payload 15 to the motor unit 6 becomes tight (FIG. 6) and the full weight of the airship is now taken by the helium in the partially inflated envelope 5. It is assumed that the weight of the cables 20 is less than the static buoyancy of the airship (necessary to allow the airship to ascend to high altitude). If this is not the case, it may be necessary to provide small helium balloons (not shown) to carry the weight of the cables 20.

With the complete airship now off the launch pad, the winches are operated to rapidly pay out the cables 20 allowing the payload 15 (see FIG. 7) and motor unit to clear the top of the tower 10. As soon as this occurs, the cables 20 (and support balloons if provided) are released from the ring 8 and the airship climbs to altitude.

It is assumed that once the motor unit 6 is clear of the launch pad 14, the winches can pay out the cables at approximately 1 m/s. Thus the entire launch sequence can be completed in approximately 4 min from the opening of the roof closure 11. This very short exposure time allows for reduced launch risk as weather prediction for such a short period of time can be made with confidence, e.g. via a number, typically 8, equispaced weather stations positioned 2–3 km from the launch station.

As the airship climbs to altitude, it will "stream" in a manner similar to that of a weather balloon with the payload 15 and motor unit 6 supported via the vertical cable 26 and cables 27. The airship will begin a down wind drift with the prevailing wind and will enter and pass through the jet stream in an unpressurised condition. As it continues to climb, the shape of the hull will begin to form (see FIG. 8) as the helium starts to expand and take up more of the internal volume of the envelope 5. This causes the centre of buoyancy to be shifted aft and the top of the envelope starts to droop over (see FIG. 9). The progressive inflation of the envelope 5 causes the main catenary suspension means 40 to start to pull on the gondola 15. Because the individual cables of the suspension means 40 are of different lengths, the payload 15 is pulled to the lower side of the envelope 5 and this, in conjunction with the weight of the solar panels 30 produces a turning moment about the centre of buoyancy causing the airship to start to pitch over into an inclined attitude.

As the altitude continues to increase, the envelope 5 inflates further and the turning moments start to balance out. The disposition of the solar panels 30 forward of the centre of buoyancy is countered by the weight of the payload 15 and motor unit 6. Eventually the finalised shape of the hull 4 is formed as the envelope comes under the effects of an internal pressure greater than that of the outside air. This occurs as the airship approaches its super-pressure height. At this altitude, the tail fins 7 will stand up erect and the airship will "weather vane" into the wind as the stability of the hull 4 form starts to take effect. As the operating altitude is reached, the fine tuning of the airship's gas fill and weight is made to ensure that the airship is in equilibrium at the right altitude and without overstessing the fabric of the envelope 5. Once this is achieved, the flight control systems can be powered up and the airship flown in the normal manner to its operating location or test site.

The descent from altitude operates in the reverse manner. The airship is flown to an area of sea well clear of shipping/air lanes. A small amount of helium is jettisoned from the envelope 5, e.g via a controlled explosion to burst a small, fixed size balloon. The airship's systems are powered down except for essential location monitoring equipment and the airship begins to sink earthwards. When the airship splashes down into the sea, it will float due to its surface area and the still trapped helium within the enclosure 5. The floating airship can then be retrieved by a support vessel for recovery of the various parts, more especially the payload 15 and motor unit 6.

With the present system of vertical launching, the payload 15 is supported inside the envelope 15 by a system of main and supplementary suspension cables which combine to support the payload adequately both in the vertical launch altitude and in the final horizontal flight altitude as well as providing for an automatic transition between those altitudes during the climb.

The long required flight duration dictates the choice of solar cells as the basic source of power. The only other power source to suit the duration would be nuclear energy, deemed impractical for self-evident reasons. Operating above conventional cloud levels, solar cells will gather energy throughout the daylight hours. During this period they will both propel the ship and charge a reversible power store for use during the night. This reversible power store could be of any suitable form, such as fly wheels, batteries or fuel cells. Presently fuel cells seem a viable solution and are chosen for the design. The specific propulsion means proposed is therefore a large array of solar cells to provide power during daylight to drive the motor unit 6 and regenerate the energy source of the fuel cells. If hydrogen/oxygen fuel cells are chosen, the regenerative power will convert water to its component gasses by electrolysis. The power source will also provide all power demanded by the payload and control systems. At night the propulsive and other power demand is provided by the fuel cells combining the hydrogen and oxygen. The electrical power is thus available 24 hours a day for powering the motor unit 6, e.g. contra-rotating propellers driven by duplex high efficiency motors applied to co-axial shafts.

At altitude, the airship is controlled entirely by signals exchanged between the airship's systems and ground stations.

The airship will contain, as part of its payload 15, a complete positioning sensor package. Position in all axes is determined by means such as use of the extant "Global Positioning System" (GPS) or by inertial methods or by radar means. Positional and motion data is passed by telemetric means to the controlling ground station. The ground station receives and decodes the telemetry signals and analyses the required control response in much the same manner as is performed by a conventional aircraft's auto-stabiliser and autopilot. Any corrective control inputs are passed back to the airship in near to real time. The corrective control is implemented in the airship by the coned rotor system which will apply longitudinal (airspeed), pitch altitude (for short-term control) and yaw control (steering direction).

Long term, or coarse altitude control is provided automatically by buoyancy means. The initial helium fill will be calculated so that at the nominal operating altitude the gas will occupy the envelope volume fully. Any perturbation in the vertical sense will therefore cause a pressure, i.e. density, change with relation to the outside atmosphere, causing a buoyancy change in the correct sense to correct the error. This system naturally causes a diurnal altitude change as the gas responds to solar heating, but this is within the long term tolerance of the system.

What is claimed is:

1. A method of launching inflatable airship apparatus for subsequent ascent to high altitude for operation as an airship having a hull formed from an inflated flexible gas containment envelope, payload means, drive means mounted at the stern of the hull and cable suspension means, for supporting the payload means within the hull, connected to said drive means and to the hull at, or adjacent to, a nose portion of the hull, the method comprising partially inflating said gas containment envelope with a lighter than air gaseous medium to cause said nose portion to fill with said gaseous medium and to rise within a vertical launch enclosure to position the partially inflated gas containment envelope in a launch position, and subsequently releasing the partially inflated gas containment envelope from its launch position through an open top of the vertical enclosure so that the envelope ascends clear of the vertical enclosure and lifts the payload means and drive means by means of the cable suspension means.

2. A method according to claim 1, in which a normally closed closure means at the top of the vertical launch enclosure is opened when the partially inflated gas containment envelope is ready for release from its launch position.

3. A method according to claim 1, in which the rise of the gas containment envelope to its launch position and subsequently through the open top of the vertical launch enclosure is restrained by cable retaining means.

4. A method according to claim 1, in which the rise of the envelope is controlled by restraining cables paid out from winches.

5. A method according to claim 4, in which connection of the restraining cables to the envelope is released after the lifted drive means has risen above the top of the vertical launch enclosure.

6. A method according to claim 1, in which only a minor proportion, i.e. from 5–10%, of the fully inflated volume of the gas containment envelope is initially filled with said gaseous medium at standard temperature and pressure (STP).

7. A method according to claim 6 wherein said gaseous medium is helium, and from 6–8% of the fully inflated volume is initially filled.

8. A method according to claim 1, in which solar cell means for powering the airship in operation are secured to the gas containment envelope when the latter is in its launch position.

9. Inflatable airship apparatus intended for ascending to high altitude for operation as an airship having an elongate hull, the airship apparatus comprising a gas containment envelope inflatable to form said elongate hull, payload means inside said gas containment envelope, drive means joined to the envelope at a region of the latter destined to form the stern of the inflated hull and cable means connecting the payload means and the drive means to a connecting portion of the gas containment envelope destined to be at the bow end of the inflated hull, the cable means being arranged to support the weight of the cable means and drive means from the said connecting portion when the gas containment envelope is partially inflated and arranged with its bow end uppermost.

10. A launch station for launching inflatable airship apparatus to high altitude, the launch station including a vertical enclosure having a top and a bottom and a vertical height from top to bottom in excess of the width of the vertical enclosure at the top, a launch pad at the bottom of the vertical enclosure for enabling airship apparatus at the bottom of the vertical enclosure to be partially inflated with lighter-than-air gaseous medium so that a nose portion of the airship apparatus is able to rise within the vertical enclosure to a launch position, openable and closable closure means at the top of the vertical enclosure, and restraining means for connection to airship apparatus to be launched for controlling ascent of the airship apparatus from the launch pad to the launch position and subsequently from the launch position through the top of the enclosure with the closure means in its open position.

11. A launch station according to claim 10, in which said top of said vertical enclosure has an opening, and an inflatable collar is provided about said opening.

* * * * *